(12) United States Patent
Peng

(10) Patent No.: US 12,731,870 B2
(45) **Date of Patent: *Sep. 8, 2026**

(54) BATTERY, MANUFACTURING METHOD THEREOF AND ELECTRONIC PRODUCT

(71) Applicant: Zhuhai CosMX Battery Co., Ltd., Zhuhai (CN)

(72) Inventor: Ning Peng, Zhuhai (CN)

(73) Assignee: Zhuhai CosMX Battery Co., Ltd., Zhuhai (CN)

( * ) Notice: Subject to any disclaimer, the term of this patent is extended or adjusted under 35 U.S.C. 154(b) by 126 days.

This patent is subject to a terminal disclaimer.

(21) Appl. No.: 18/603,388

(22) Filed: Mar. 13, 2024

(65) Prior Publication Data

US 2024/0222817 A1 Jul. 4, 2024

Related U.S. Application Data

(63) Continuation of application No. 17/028,304, filed on Sep. 22, 2020, now Pat. No. 11,962,043.

(30) Foreign Application Priority Data

Jun. 19, 2020 (CN) ........................ 202010567303.7

(51) Int. Cl.
*H01M 4/66* (2006.01)
*B23K 26/0622* (2014.01)
(Continued)

(52) U.S. Cl.
CPC ......... *H01M 50/54* (2021.01); *B23K 26/0622* (2015.10); *B23K 26/22* (2013.01); *H01M 4/667* (2013.01); *H01M 50/536* (2021.01)

(58) Field of Classification Search
CPC .. B23K 26/244; B23K 2103/10; B23K 26/22; B23K 15/008; B23K 2103/18;
(Continued)

(56) References Cited

U.S. PATENT DOCUMENTS 5,246,797 A * 9/1993 Imhof ................. H01M 50/534 429/234
6,117,589 A * 9/2000 Satou ................. H01M 50/531 429/211

(Continued)

FOREIGN PATENT DOCUMENTS

CN 103682250 A 3/2014
CN 106207272 A 12/2016

(Continued)

OTHER PUBLICATIONS

Limmaneevichitr et al. ("Experiments to Simulate Effect of Marangoni Convection on Weld Pool Shape" Welding Journal. 79. Aug. 2002. pp. 231s-237s) (Year: 2000).*

(Continued)

*Primary Examiner* — Jessie Walls-Murray
(74) *Attorney, Agent, or Firm* — Dilworth IP, LLC

(57) ABSTRACT

The present disclosure provides a battery, a manufacturing method thereof and an electronic product. The battery cell includes electrodes and tabs, where each of the electrodes includes a current collector and an active material layer, and the current collector includes a coating zone coated with the active material layer and an empty foil zone, and an end of a tab overlaps the empty foil zone and the tab and the empty foil zone are connected by laser welding; the side of the empty foil zone facing away from the tab has a plurality of dot-shaped welding marks arranged at intervals, and the dot-shaped welding marks include a concave part and an annular convex part surrounding the concave part. The contact area between the annular convex part and the separator between the positive electrode and the negative electrode is large, and the separator is less likely to be pierced.

7 Claims, 5 Drawing Sheets

(51) Int. Cl.
*B23K 26/22* (2006.01)
*H01M 50/536* (2021.01)
*H01M 50/54* (2021.01)

(58) Field of Classification Search
CPC ............ B23K 2103/12; B23K 2101/36; B23K 26/0622; B23K 26/323; B23K 2101/38; B23K 11/11; B23K 35/0288; H01R 43/0221; H01R 4/625; H01M 50/516; H01M 50/536; H01M 50/566; H01M 50/54; H01M 50/531; H01M 50/533; H01M 50/534; H01M 50/538
See application file for complete search history.

(56) References Cited

U.S. PATENT DOCUMENTS

| | | | | |
|---|---|---|---|---|
| 2009/0223940 | A1* | 9/2009 | Hosoya | H01M 50/105<br>219/136 |
| 2010/0247992 | A1* | 9/2010 | Miyata | B23K 26/32<br>29/623.2 |
| 2014/0193682 | A1* | 7/2014 | Suzuki | H01M 4/13<br>429/94 |
| 2015/0217395 | A1* | 8/2015 | Spinella | B23K 11/11<br>403/267 |
| 2019/0245193 | A1* | 8/2019 | Kim | H01M 50/553 |
| 2019/0329353 | A1* | 10/2019 | Dai | B23K 26/082 |
| 2020/0168885 | A1* | 5/2020 | Lee | B23K 26/0622 |

FOREIGN PATENT DOCUMENTS

| | | | |
|---|---|---|---|
| CN | 207868261 | U | 9/2018 |
| CN | 209447912 | U | 9/2019 |
| CN | 110611116 | A | 12/2019 |
| CN | 116885093 | A | 10/2023 |
| JP | 2001102033 | A | 4/2001 |

OTHER PUBLICATIONS

Tadamalle et al. (“Influence of laser welding process parameters on weld pool geometry and duty cycle” Advances in Production Engineering & Management, vol. 8, No. 1, 2013, pp. 52-60). (Year: 2013).*

Khan et al. (“Experimental investigation on laser beam welding of martensitic stainless steels in a constrained overlap joint configuration”, Journal of Materials Processing Technology 210 (2010) 1340-1353) (Year: 2010).*

Wuhan King’s Laser Co., Ltd. (“Laser welding of Battery Busbar”, May 11, 2023, https://www.kingslaser.com/info/laser-welding-of-battery-busbar-81997430.html) (Year: 2023).*

First Office Action in CN Patent Application No. 202311038247.8 dated Aug. 4, 2026.

Notification to Grant Patent Right for Invention in CN Patent Application No. 202311038158.3 dated May 19, 2026.

* cited by examiner

BATTERY, MANUFACTURING METHOD THEREOF AND ELECTRONIC PRODUCT

CROSS-REFERENCE TO RELATED APPLICATION

This application is a continuation of U.S. patent application Ser. No. 17/028,304, filed on Sep. 22, 2020, which claims priority to Chinese Patent Application No. 202010567303.7, filed on Jun. 19, 2020. The contents of the above applications are hereby incorporated by reference in their entireties.

TECHNICAL FIELD

The present disclosure relates to the technical field of lithium batteries, and in particular to a battery, a manufacturing method of a battery, and an electronic product.

BACKGROUND

With the development of science and technology, more and more electronic products have entered various aspects of people's lives, and the normal use of electronic products cannot be separated from batteries, where lithium-ion batteries have been widely used in electronic products in various fields due to their high energy density and environmental friendliness. With the development of electric vehicle technology, lithium-ion batteries have attracted the attention in the field of electric vehicles.

With the wide application of lithium-ion batteries, more and more attention has been paid to the quality and safety performance of lithium-ion batteries themselves. In the existing lithium-ion batteries, electrodes and the tabs are connected by ultrasonic welding. In a specific implementation, a welding head is in contact with a tab side and applies pressure and vibrations to weld and connect the tab and the electrode.

However, needle-shaped welding protrusions will be formed on the electrode side as shown in FIG. 1 after the ultrasonic welding, and the needle-shaped welding protrusions may easily pierce a separator between a positive electrode and a negative electrode, resulting in short-circuit contact between the positive electrode and the negative electrode, which may thus cause serious safety problems.

SUMMARY

The present disclosure provides a battery, a manufacturing method of a battery, and an electronic product, and protrusions formed by welding an electrode and a tab of the battery is less likely to pierce a separator between a positive electrode and a negative electrode, so that a short circuit could be prevented, which is beneficial to the improvement of the quality and safety performance of the battery.

In a first aspect, the present disclosure provides a battery, which includes a housing and a battery cell accommodated in the housing; the battery cell includes electrodes and tabs where each of the electrodes includes a current collector and an active material layer, and the current collector includes a coating zone coated with the active material layer and an empty foil zone not coated with the active material layer, an end of a tab overlaps the empty foil zone and the tab and the empty foil zone are fixedly connected by laser welding; a surface of the empty foil zone facing away from the tab has a plurality of dot-shaped welding marks arranged at intervals, and each of the dot-shaped welding marks includes a concave part and an annular convex part surrounding a periphery of the concave part; a surface of the tab facing away from the empty foil zone has no welding mark.

The battery provided by the present disclosure includes a housing and a battery cell accommodated in the housing, where the battery cell includes electrodes and tabs; each of the electrodes includes a current collector and an active material layer; the current collector includes a coating zone coated with the active material layer and an empty foil zone not coated with the active material layer; an end of the tab is overlapped over the empty foil zone, and the tab and the empty foil zone are fixedly connected by the laser welding, so as to, on the one hand, avoid that the performance of the battery is affected by pseudo welding or over welding caused by welding head wear, and on the other hand, save the work of replacing the welding head. After the laser welding is completed, a plurality of dot-shaped welding marks arranged at intervals are formed on the surface of the empty foil zone facing away from the tab, and the dot-shaped welding mark includes a concave part and an annular convex part surrounding the periphery of the concave part. Since the contact area between the annular convex part and a separator is larger than that between a needle-shaped welding protrusion and a separator in the prior art, the pressure between the annular convex part and the separator is lower, and thus the annular convex part is less likely to pierce the separator between the positive electrode and the negative electrode, thereby preventing a short circuit and being beneficial to the improvement of the quality and safety performance of the battery. Furthermore, the surface of the tab facing away from the empty foil zone has no welding mark, that is, the original flatness of the tab may be maintained unchanged through the surface of the tab facing away from the empty foil zone during the welding process, and thus the surface of the tab facing away from the empty foil zone could be prevented from forming an unfavorable structure to the separator during the welding process, which is beneficial to the improvement of the quality and reliability of the battery.

As for the battery described above, in an implementation, a height of the annular convex part is within 30 μm; a depth of the concave part is smaller than a sum of thicknesses of the empty foil zone and the tab.

As for the battery described above, in an implementation, the depth of the concave part is between 20 μm and 70 μm.

As for the battery described above, in an implementation, a sidewall of the concave part at least has a partial cylindrical wall surface or a partial truncated cone-shaped wall surface.

As for the battery described above, in an implementation, a diameter of the dot-shaped welding mark is between 50 μm and 300 μm; and/or, a distance between two adjacent dot-shaped welding marks is not less than 100 μm.

As for the battery described above, in an implementation, a plurality of the dot-shaped welding marks are arranged in an array; and/or, the number of the dot-shaped welding marks is between 150 and 800.

As for the battery described above, in an implementation, a minimum distance between the dot-shaped welding mark and the coating zone is larger than 1 mm; and/or, the empty foil zone is located in the middle of the electrode.

As for the battery described above, in an implementation, a bottom surface of the concave part has a central convex part, and a height of the central convex part is smaller than a depth of the concave part.

In a second aspect, the present disclosure provides a manufacturing method of a battery, including: providing electrodes, tabs and a separator, where each of the electrodes has a coating zone and an empty foil zone; for each pair of an electrode and a tab attaching the empty foil zone of the electrode to the tab; performing, by using a laser welding device, pulse dot welding from a surface of the empty foil zone facing away from the tab to form a plurality of dot-shaped welding marks arranged at intervals; each of the dot-shaped welding marks includes a concave part and an annular convex part surrounding a periphery of the concave part; a surface of the tab facing away from the empty foil zone has no welding mark; processing the electrode welded with the tab and a separator together to form a battery cell; and assembling the battery cell into a housing to form a battery.

In the manufacturing method of a battery according to the present disclosure, the empty foil zone of the electrode is attached to the tab, and the laser welding device is used to perform pulse dot welding from the surface of the empty foil zone facing away from the tab to form a plurality of dot-shaped welding marks arranged at intervals. Adopting the laser welding could, on the one hand, avoid that the performance of the battery is influenced by a pseudo welding or over welding caused by welding head wear, and on the other hand, save the work of replacing the welding head. Furthermore, the dot-shaped welding marks formed by laser welding include a concave part and an annular convex part surrounding the periphery of the concave part. Since a contact area between the annular convex part and a separator is larger than that between a needle-shaped welding protrusion and a separator in the prior art, the pressure between the annular convex part and the separator is lower, and thus the annular convex part is less likely to pierce the separator between the positive electrode and the negative electrode, thereby preventing a short circuit and being beneficial to the improvement of the quality and safety performance of the battery. Furthermore, the surface of the tab facing away from the empty foil zone has no welding mark, that is, the original flatness of the tab may be maintained unchanged through the surface of the tab facing away from the empty foil zone during the welding process, and thus the surface of the tab facing away from the empty foil zone could be prevented from forming an unfavorable structure to the separator during the welding process, which is beneficial to the improvement of the quality and reliability of the battery.

In a third aspect, the present disclosure provides an electronic product including the battery as described above.

The electronic product provided by the present disclosure includes a battery, which includes a housing and a battery cell accommodated in the housing, where the battery cell includes electrodes and tabs; each of the electrodes includes a current collector and an active material layer; the current collector includes a coating zone coated with the active material layer and an empty foil zone not coated with the active material layer; an end of the tab is overlapped over the empty foil zone, and the tab and the empty foil zone are fixedly connected by the laser welding, so as to, on the one hand, avoid that the performance of the battery is affected by pseudo welding or over welding caused by welding head wear, and on the other hand, save the work of replacing the welding head. After the laser welding is completed, a plurality of dot-shaped welding marks arranged at intervals are formed on a surface of the empty foil zone facing away from the tab, and the dot-shaped welding marks include a concave part and an annular convex part surrounding the periphery of the concave part. Since a contact area between the annular convex part and a separator is larger than that between a needle-shaped welding protrusion and a separator in the prior art, the pressure between the annular convex part and the separator is lower, and thus the annular convex part is less likely to pierce the separator between the positive electrode and the negative electrode, thereby preventing a short circuit and being beneficial to the improvement of the quality and safety performance of the battery. Furthermore, the surface of the tab facing away from the empty foil zone has no welding mark, that is, the original flatness of the tab may be maintained unchanged through the surface of the tab facing away from the empty foil zone during the welding process, and thus the surface of the tab facing away from the empty foil zone could be prevented from forming an unfavorable structure to the separator during the welding process, which is beneficial to the improvement of the quality and reliability of the battery.

BRIEF DESCRIPTION OF DRAWINGS

In order to explain the embodiments of the present disclosure or the technical solution in the prior art more clearly, the drawings required in the description of the embodiments or the prior art will be briefly introduced below. Obviously, the drawings in the following description are some embodiments of the present disclosure, and other drawings can be obtained according to these drawings without creative effort.

DESCRIPTION OF REFERENCE NUMERALS

20—electrode;
21—dot-shaped welding mark;
211—concave part;
212—annular convex part;
213—central convex part;
30—tab.

DESCRIPTION OF EMBODIMENTS

In the prior art, tabs and electrodes of a battery cell are usually connected by ultrasonic welding and, the welding head is required to contact with the tab side and apply pressure and vibration so as to weld the tab and the electrode during the ultrasonic welding. In this process, the welding head may be worn, which on the one hand is easy to lead to pseudo welding or over welding between the tabs and electrodes and then affect the performance of the battery; on the other hand, the welding head requires to be replaced regularly, thereby increasing the workload.

Figure 1:
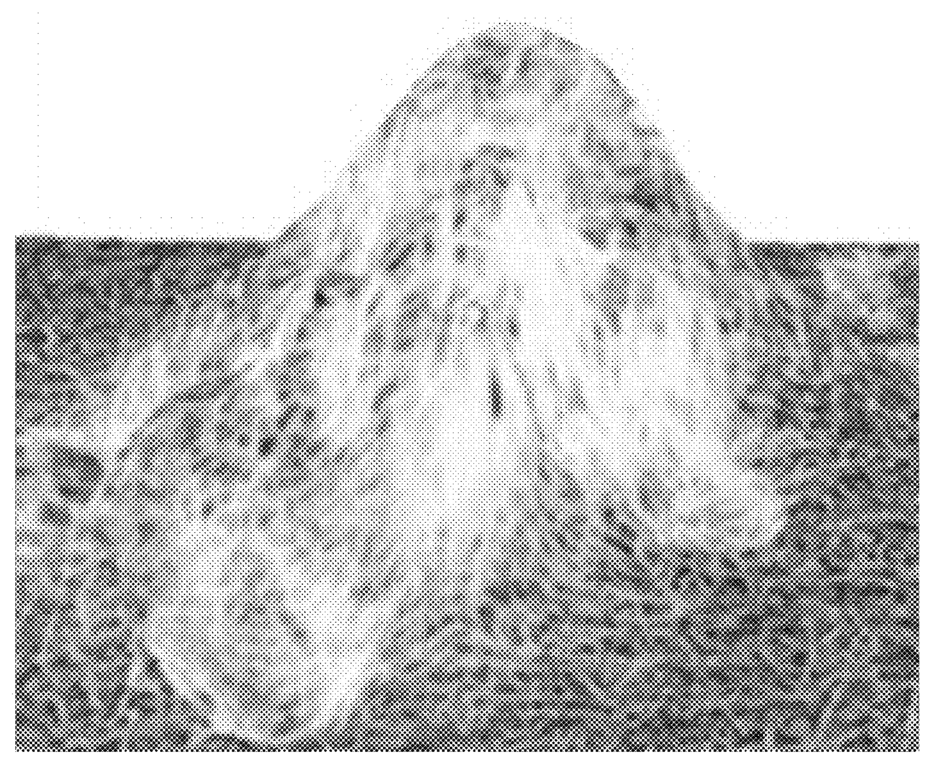
FIG. 1 is a microscopic view of a needle-shaped welding protrusion formed on an electrode side after ultrasonic welding according to the prior art.

At the same time, a sharp needle-shaped welding protrusion as shown in FIG. 1 will be formed on the electrode side by the ultrasonic welding, a contact area between the needle-shaped welding protrusion and a separator between a positive electrode and a negative electrode is only an area at an apex of the needle-shaped welding protrusion, leading to that pressure between the needle-shaped welding protrusion and the separator, is relatively large and the needle-shaped welding protrusion is likely to pierce the separator, resulting in a short-circuit contact between the positive electrode and negative electrode, which may cause serious safety problems.

In order to solve the above technical problem, the present disclosure provides a battery, where the electrode and the tab of the battery are fixedly connected by laser welding, and the laser welding process is a method of welding the electrode and the tab from the electrode side by using a laser beam with high energy density as a heat source. Laser welding does not have the problem of welding head wear, so there is no issue of pseudo welding or over welding caused by welding head wear, and there is also no issue of increased workload caused by the welding head replacement. At the same time, a contact area between the annular protrusion and the separator formed after laser welding is the whole annular top of the annular protrusion, which is obviously larger than the contact area between the needle-shaped welding protrusion and the separator in the prior art, so the pressure between the annular protrusion and the separator is lower, and thus the annular protrusion is less likely to pierce the separator between the positive electrode and the negative electrode and then cause a short circuit, which is beneficial to the improvement of the quality and safety performance of the battery.

To make the purpose, technical solution and advantage of the embodiments of the present disclosure clearer, the technical solutions in embodiments of the present disclosure are described in the following clearly and comprehensively with reference to the accompanying drawings in embodiments of the present disclosure. Apparently, the described embodiments are merely part rather than all of embodiments of the present disclosure. All other embodiments obtained by persons of ordinary skill in the art based on the embodiments of the present disclosure without creative effort shall fall within the protection scope of the present disclosure.

First Embodiment

Figure 2:
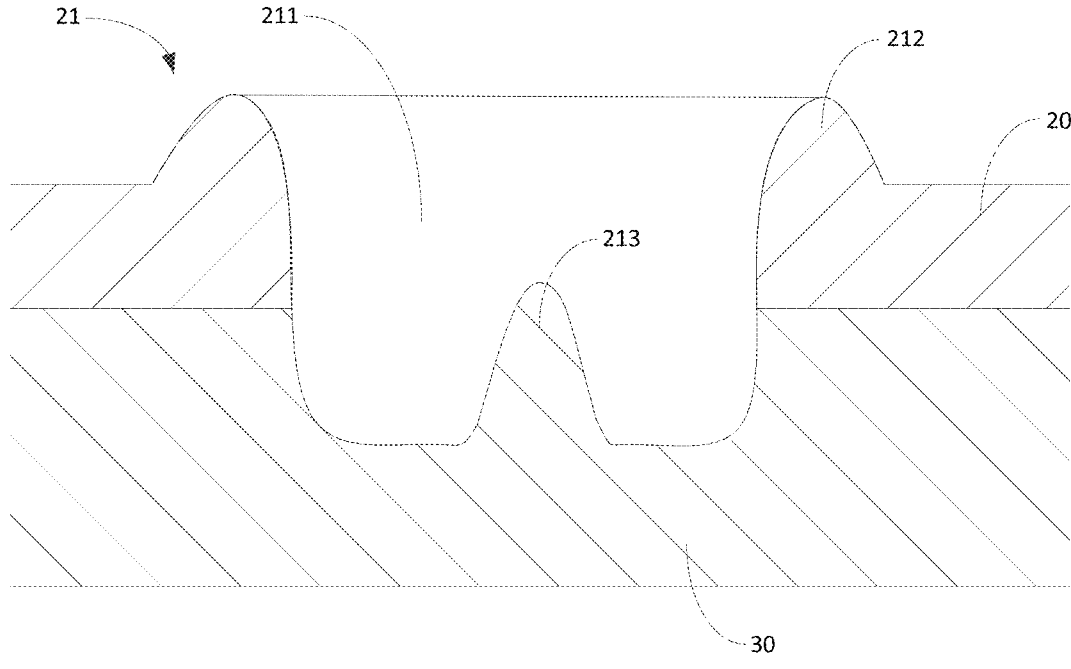
FIG. 2 is a cross-sectional view of a dot-shaped welding mark formed after an electrode and a tab of a battery cell are welded according to a first embodiment of the present disclosure.
Figure 3:
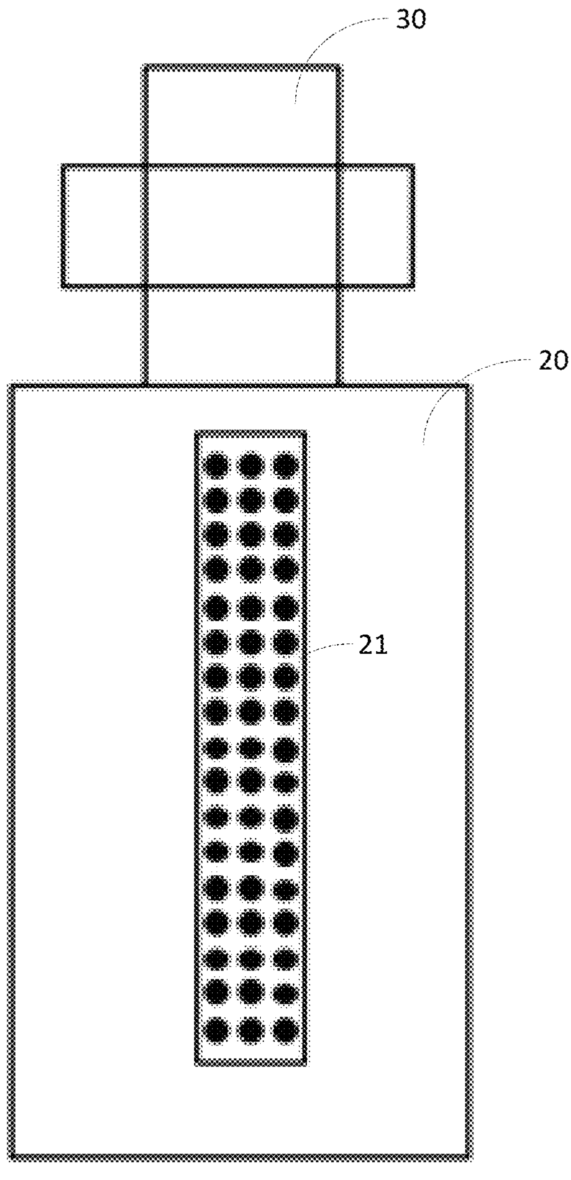
FIG. 3 is a structural schematic diagram of an electrode side after the electrode and the tab of the battery cell are welded according to the first embodiment of the present disclosure.
Figure 4:
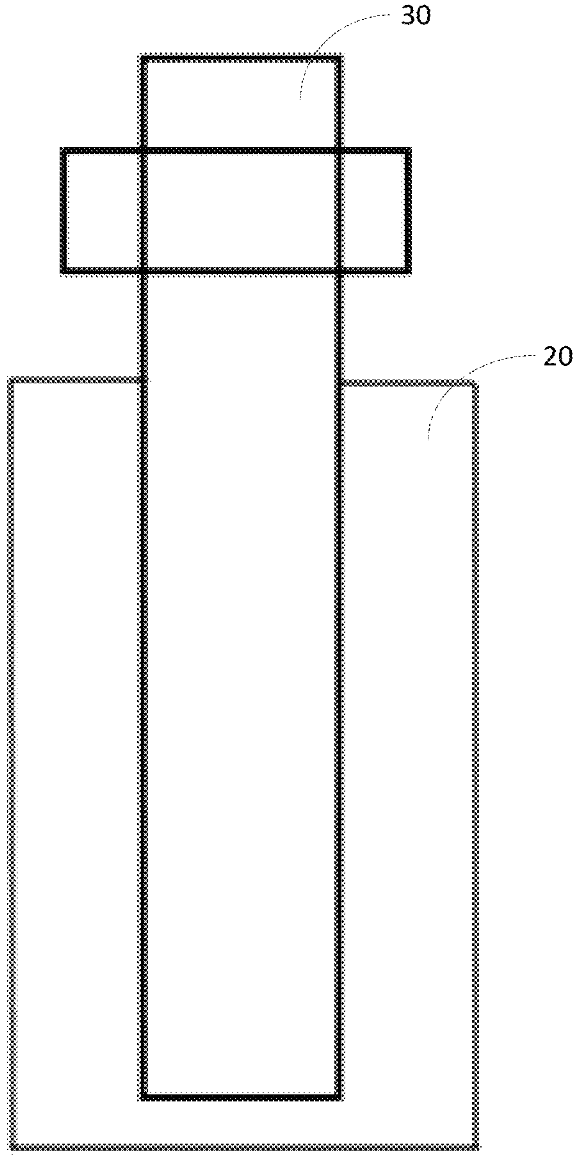
FIG. 4 is a structural schematic diagram of a tab side after the electrode and the tab of the battery cell are welded according to the first embodiment of the present disclosure.
Figure 5:
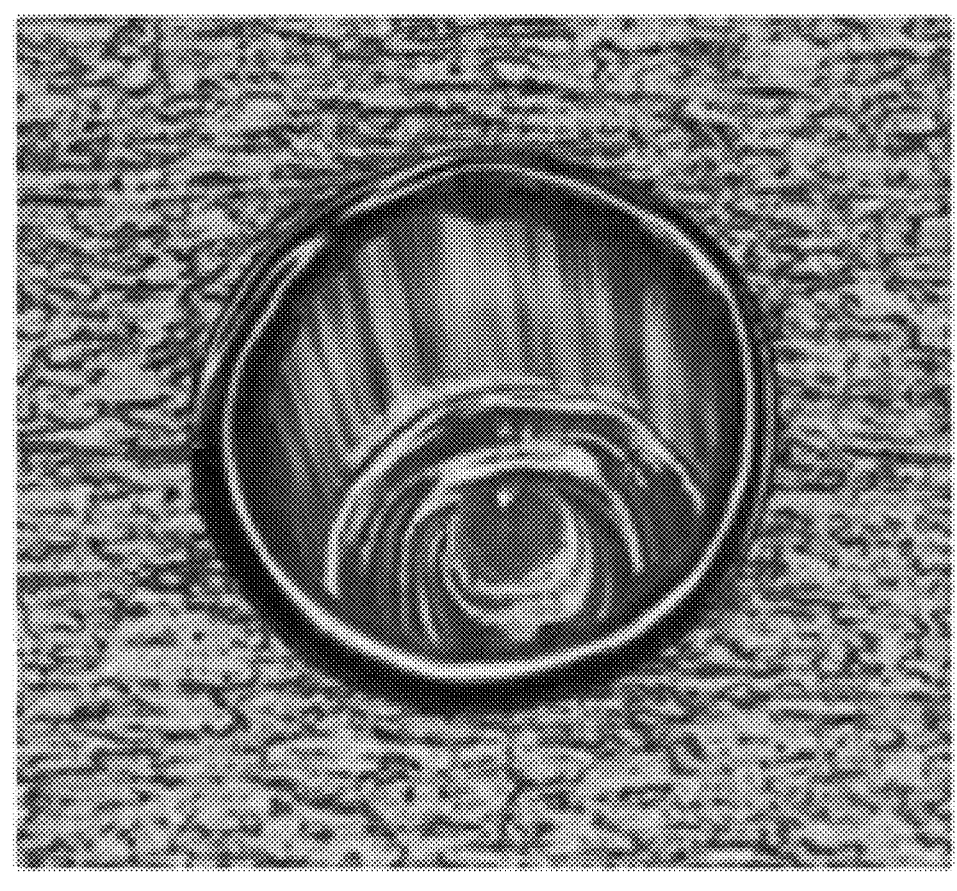
FIG. 5 is a microscopic view of a dot-shaped welding mark formed after the electrode and the tab of the battery cell are welded according to the first embodiment of the present disclosure.

FIG. 2 is a cross-sectional view of a dot-shaped welding mark formed after an electrode and a tab of a battery cell are welded according to a first embodiment of the present disclosure; FIG. 3 is a structural schematic diagram of an electrode side after the electrode and the tab of the battery cell are welded according to the first embodiment of the present disclosure; FIG. 4 is a structural schematic diagram of a tab side after the electrode and the tab of the battery cell are welded according to the first embodiment of the present disclosure; FIG. 5 is a microscopic view of a dot-shaped welding mark formed after the electrode and the tab of the battery cell are wielded according to the first embodiment of the present disclosure.

Referring to FIG. 2 to FIG. 5, the present embodiment provides a battery, which includes a housing and a battery cell accommodated in the housing. The battery cell includes electrodes 20 and tabs 30, where each of the electrodes 20 includes a current collector and an active material layer, the current collector includes a coating zone coated with the active material layer and an empty foil zone not coated with the active material layer, an end of the tab 30 overlaps the empty foil zone and the tab 30 and the empty foil zone are fixedly connected by laser welding.

The battery cell may be a wound battery cell or a laminated battery cell; the electrode may be either a positive electrode or a negative electrode. The electrode includes a current collector and an active material layer coated on the current collector surface. In order to weld the tab with the current collector, it is necessary to reserve an empty foil zone on the current collector surface which is not coated with the active material layer, or remove the active material layer in some area of the current collector surface to expose the current collector. The exposed current collector surface is the empty foil zone, while the area covered with the active material layer is the coating zone. Generally, the current collector of positive electrode is aluminum foil, while the current collector of negative electrode is copper foil.

Specifically, the wound battery cell includes a positive electrode, a negative electrode and a separator separating the positive electrode and the negative electrode; a positive tab is welded on the positive electrode and a negative tab is welded on the negative electrode; in the winding process, the positive electrode, the separator and the negative electrode are wound in the same direction from the winding head and finally form a wound battery cell.

The laminated battery cell includes a positive electrode, a negative electrode and a separator separating the positive electrode from the negative electrode; a positive tab is welded on the positive electrode and a negative tab is welded on the negative electrode; the positive electrode and the negative electrode are alternately stacked during the processing, and the separator is stacked between two adjacent positive electrode and negative electrode, and finally stacked to form a laminated battery.

Generally, the laser welding is to weld the tab 30 and the electrode 20 from the electrode 20 side. After the laser welding is completed, a plurality of dot-shaped welding marks 21, such as round dot-shaped welding marks, arranged at intervals are formed on a surface of the empty foil zone facing away from the tab. Specifically, the dot-shaped welding mark 21 includes a concave part 211 and an annular convex part 212 surrounding a periphery of the concave part 211.

A surface of the tab 30 facing away from the empty foil zone in the present embodiment has no welding mark. Since laser welding is carried out from the surface of the empty foil zone facing away from the tab 30, the dot-shaped welding mark 21 is only formed on the surface of the empty foil zone facing away from the tab 30, while the surface of the tab 30 facing away from the empty foil zone maintains the original surface of the tab 30. That is to say, the original flatness of the surface of the tab 30 facing away from the empty foil zone will not be affected by welding, thereby avoiding the formation of unfavorable structures on the surface of the tab 30 during welding.

In a specific implementation, first, an end of the tab 30 and the empty foil zone of the electrode 20 are overlapped and attached. For example, the empty foil zone of the electrode 20 can be tightly attached to the tab 30 by a hold-down fixture or an absorption fixture, so as to avoid the situation that the electrode 20 is welded through due to loose attachment. Then, after setting a process parameter of the laser welding device, the laser welding device performs pulse dot welding on the tab 30 and the electrode 20 from a surface of the empty foil zone facing away from the tab 30, so as to form dot-shaped welding marks 21 on the surface of the empty foil zone facing away from the tab 30, while there is no welding mark on the surface of the tab 30 facing away from the empty foil zone. The dot-shaped welding mark 21 includes a concave part 211 and an annular convex part 212 surrounding the periphery of the concave part 211. For example, the concave part 211 may be a circular pit, and the annular convex part 212 is a ring-shaped protrusion surrounding the periphery of the circular pit.

The battery provided in the present embodiment includes a housing and a battery cell accommodated in the housing, where the battery cell includes electrodes 20 and tabs 30; each of the electrodes 20 includes a current collector and an active material layer; the current collector includes a coating zone coated with the active material layer and an empty foil zone not coated with the active material layer; an end of the tab is overlapped over the empty foil zone, and the tab 30 and the empty foil zone of the electrode 20 are fixedly connected by laser welding, so as to, on the one hand, avoid that the performance of the battery is affected by pseudo welding or over welding caused by welding head wear, and on the other hand, save the work of replacing the welding head. After the laser welding is completed, a plurality of dot-shaped welding marks 21 arranged at intervals are formed on the surface of the empty foil zone of the electrode 20 facing away from the tab, and the dot-shaped welding mark 21 includes a concave part 211 and an annular convex part 212 surrounding the periphery of the concave part 211. Since the contact area between the annular convex part 212 and the separator is larger than that between the needle-shaped welding protrusion and the separator in the prior art, the pressure between the annular convex part 212 and the separator is lower, and thus the annular convex part 212 is less likely to pierce the separator between the positive electrode and the negative electrode, thereby preventing a short circuit and thus being beneficial to the improvement of the quality and safety performance of the battery. Furthermore, the surface of the tab 30 facing away from the empty foil zone has no welding mark, that is, the original flatness of the tab 30 could be maintained unchanged through the surface of the tab 30 facing away from the empty foil zone during the welding process, so that the surface of the tab 30 facing away from the empty foil zone could be prevented from forming an unfavorable structure to the separator during the welding process, which is beneficial to the improvement of the quality and reliability of the battery.

Specifically, in the present embodiment, after the laser welding, a height of the annular convex part 212 of the dot-shaped welding mark 21 formed on the side of the electrode 20 is within 30 μm; in the prior art, the height of the needle-shaped welding protrusion formed on the electrode side after ultrasonic welding reaches more than 80 μm. It can be seen that the annular convex part 212 in the present embodiment has a smaller height, and thus is less likely to pierce the separator between the positive electrode and negative electrode, thereby preventing a short circuit and thus being beneficial to the improvement of the quality and safety performance of the battery.

Generally, a distance between the separator located at the tab 30 side and the tab 30 is relatively close, and therefore it is easier to pierce the separator by forming a protrusion on the tab 30 side. The depth of the concave part 211 in the present embodiment is less than a sum of thicknesses of the empty foil zone of the electrode 20 and the tab 30, that is, the concave part 211 of the dot-shaped welding mark 21 may not form a protrusion on the tab 30 side, thereby avoiding a short circuit caused by piercing the separator on the tab 30 side, and thus being beneficial to the improvement of the quality and safety performance of the battery.

Further, a depth of the concave part 211 is between 20 μm and 70 μm. Generally, the thickness of the current collector of the electrode is between 5 μm and 15 μm, and the thickness of the tab is between 30 μm and 100 μm. In a specific implementation, the laser energy may be adjusted to make the depth of the concave part 211 between 20 μm and 70 μm, as long as it can be ensured that the concave part 211 would not form a protrusion on the tab 30 side, and that the electrode 20 and the tab 30 could not be welded through.

Referring to FIG. 2, a sidewall of the concave part 211 in the present embodiment has at least a partial cylindrical wall surface or a partial truncated cone-shaped wall surface. In other implementations, the sidewall of the concave part 211 may also be formed as a truncated cone-shaped wall surface, and the end of the truncated cone-shaped wall surface near the bottom surface of the concave part 211 is smaller than the end of the truncated cone-shaped wall surface away from the bottom surface of the concave part 211.

In the present embodiment, a diameter of the dot-shaped welding mark 21 is between 50 μm and 300 μm. In a specific implementation, when the diameter of the dot-shaped welding mark 21 is too small, the welding effect between the electrode 20 and the tab 30 is poor. When the diameter of the dot-shaped welding marks 21 is too large, it is not beneficial to the arrangement of the dot-shaped welding marks 21 on the electrode 20.

In the present embodiment, the space between two adjacent dot-shaped welding marks 21 is not less than 100 μm. When the space between two adjacent dot-shaped welding marks 21 is too narrow, heat dissipation during the welding process is poor, thus resulting in heat accumulation and further oxidation and blackening or even perforation of the electrode 20, which will affect the welding effect between the electrode 20 and the tab 30, and is not beneficial to the quality and safety performance of the battery.

In an implementation, as shown in FIG. 3, a plurality of dot-shaped welding marks 21 are arranged on the electrode 20 side. In a specific implementation, the number of rows and columns of the dot-shaped welding marks 21 may be set according to actual needs, as long as the electrode 20 and the tab 30 can be welded firmly to ensure a better power transmission effect between the electrode 20 and the tab 30, which is not particularly limited herein.

In other implementations, the arrangement of a plurality of dot-shaped welding marks 21 on the side of the electrode 20 may also be adjusted according to actual needs, as long as the requirements of the present embodiment can be achieved, which will not be repeated herein.

Further, the number of dot-shaped welding marks 21 in the present embodiment is between 150 and 800, which on the one hand can ensure that the welding tension between the electrode 20 and the tab 30 meets a requirement, and on the other hand ensure the efficiency of laser welding.

In order to avoid that the laser for welding impacts the coating zone of the electrode 20 and affects the active material layer of the electrode 20 during the laser welding process, a minimum distance between the dot-shaped welding marks 21 and the coating zone of the electrode 20 is set to be larger than 1 mm in the present embodiment, so as to avoid accidentally damaging the active material layer of the electrode during the welding process, which is further beneficial to ensuring that the quality of the battery is not affected.

Generally, the empty foil zone is located at the head or tail of the current collector in the electrode. When the tab 30 is welded with the empty foil zone of the electrode 20, the tab 30 is located at the head or tail of the electrode 20. In order to ensure the efficiency of electric energy transmission between the electrode 20 and the tab 30, the empty foil zone of the electrode 20 may also be set in the middle of the electrode 20, and part of the active material layer in the middle of the electrode 20 may be removed to form the empty foil zone. For example, in a wound battery cell, the empty foil zone may be disposed at the middle position of the electrode of the wound battery cell along the length direction; for another example, in a laminated battery cell, the empty foil zone may extend outward from the middle position of the electrode of the laminated battery cell. At this time, after the tab 30 is welded and connected with the empty foil zone of the electrode 20, the tab 30 could be located in the middle of the electrode 20, which is beneficial to the improvement of the power transmission efficiency between the tab 30 and the electrode 20.

Referring to FIG. 2, the bottom surface of the concave part 211 of the present embodiment has a central convex part 213, and the height of the central convex part 213 is less than the depth of the concave part 211. In a specific implementation, since the height of the central convex part 213 is less than the depth of the concave part 211, the central convex part 213 does not contact the separator between the positive electrode and negative electrode, that is, the central convex part 213 will not affect the separator between the positive electrode and negative electrode.

The present embodiment also provides a manufacturing method of a battery, includes:

providing electrodes, tabs and a separator, where each of the electrodes is provided with a coating zone and an empty foil zone; for each pair of an electrode and a tab, attaching the empty foil zone of the electrode to the tab; performing, by using a laser welding device, pulse dot welding from a surface of the empty foil zone facing away from the tab to form a plurality of dot-shaped welding marks arranged at intervals, where the dot-shaped welding mark includes a concave part and an annular convex part surrounding the periphery of the concave part; at the same time, the surface of the tab facing away from the empty foil zone has no welding mark; processing the electrode welded with the tab and a separator together to form a battery cell; and assembling the battery cell into a housing to form a battery.

In a specific implementation, the electrodes include a positive electrode and a negative electrode, and the tabs include a positive tab and a negative tab. First, the empty foil zone of the positive electrode may be attached to the positive tab, for example, the empty foil zone of the positive electrode may be tightly attached to the positive tab by a hold-down fixture or a absorption fixture. Then, a parameter of the laser welding device is set, for example, it may be set that the pulse frequency is greater than 500 Hz, and the pulse width is less than 5 ms, etc., and the laser welding device is used to perform pulse dot welding on the positive tab and the positive electrode from the side of the positive electrode, with the total welding time not exceeding Is, so that a plurality of dot-shaped welding marks arranged at intervals are formed on the surface of the positive electrode, where a dot-shaped welding mark includes a concave part and an annular convex part surrounding the periphery of the concave part, and meanwhile, there is no welding mark on the surface of the tab facing away from the empty foil zone.

In the same way, the empty foil zone of the negative electrode may be attached to the negative tab, and then the laser welding device may be used to perform pulse dot welding on the negative tab and the negative electrode from one side of the negative electrode, with the total welding time not exceeding Is, so that a plurality of dot-shaped welding marks arranged at intervals are formed on the surface of the negative electrode, where a dot-shaped welding mark includes a concave part and an annular convex part surrounding the periphery of the concave part, and meanwhile, there is no welding on the surface of the tab facing away from the empty foil zone.

Finally, the positive electrode welded with the positive tab, the negative electrode welded with the negative tab and the separator are processed together to form a battery cell, for example, a wound battery cell may be formed by winding or a laminated battery cell may be formed by stacking.

In the battery cell of the present embodiment, after the electrode and the tab are welded together by laser welding, measured welding tension between the positive electrode and the positive tab is greater than 25 N, and measured welding tension between the negative electrode and the negative tab is greater than 8 N; besides, after the tension continues to be applied to pull the tab and the electrode apart, the area of the current collector of the electrode remaining on the tab accounts for more than 50% of the area of the whole welding zone.

The process of measuring the welding tension between the tab and the electrode by using a tension meter is as follows: firstly, using adhesive tape to stick the welding zone on the electrode side; then clamping the top of the tab with the upper part of the tension meter, clamping the bottom of the aluminum foil material with the lower part of the tension meter, adjusting the tension display mode to the peak display mode, and resetting the tension meter to start the measurement: pressing the "up" button to pull in the opposite direction apart at 180 degrees until the tab is separated from the electrode; finally, reading the value displayed by the tension meter and recording it, and meanwhile, taking down the tab and measuring the ratio of the area of the current collector of the electrode remaining on the tab to the total area of the welding zone.

Second Embodiment

The present embodiment provides an electronic product, which includes a battery.

The battery in the present embodiment has the same structure as the battery according to the first embodiment, and could bring the same or similar technical effects, which will not be repeated herein. For details, please refer to the description of the above embodiment.

In the description of the present disclosure, it should be understood that the orientations or positional relationships indicated by the terms "top", "bottom", "upper" and "lower" (if any) are based on the orientations or positional relationships shown in the accompanying drawings, which are only for the convenience of describing the present disclosure and simplifying the description, rather than indicating or implying that the referred apparatuses or elements shall have a specific orientation, or be constructed and operated in a specific orientation, and thus should not be understood as limiting the present disclosure.

In the description of the present disclosure, it should be noted that, unless otherwise clearly specified and defined, the terms "installation", "interconnection", and "connection" should be understood in a broad sense, for example, they may be a fixed connection or a detachable connection, or an integrated connection; they may be a mechanical connection or an electrical connection; they may be a direct interconnection, or an indirect interconnection through an intermediate medium, and they may be an internal communication between two elements. For persons of ordinary skill in the art, the specific meanings of the above terms in the present disclosure can be understood based on specific situations.

The terms "first", "second", etc., in the specification and claims and the above-mentioned accompanying drawings of the present application are used to distinguish similar objects, and are not necessarily used to describe a specific order or sequence. It should be understood that the number thus used may be interchanged under appropriate circumstances, such that the embodiments of the application described herein for example may be implemented in an order other than those illustrated or described herein.

Finally, it should be noted that the above embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some technical features thereof, without departing from the spirit and scope of the technical solutions of embodiments of the present disclosure.

What is claimed is:

1. A battery, comprising a housing and a battery cell accommodated in the housing, wherein the battery cell comprises electrodes and tabs, wherein each of the electrodes comprises a current collector and an active material layer, the current collector comprises a coating zone coated with the active material layer and an empty foil zone not coated with the active material layer, an end of a tab overlaps the empty foil zone and the tab and the empty foil zone are fixedly connected by laser welding;

a surface of the empty foil zone facing away from the tab has a plurality of dot-shaped welding marks arranged at intervals, and each of the dot-shaped welding marks comprises a concave part and an annular convex part surrounding a periphery of the concave part;

the plurality of dot-shaped welding marks are arranged in an array;

a minimum distance between a dot-shaped welding mark and the coating zone is larger than 1 mm;

a height of the annular convex part is within 30 μm;

a depth of the concave part is smaller than a sum of thicknesses of the empty foil zone and the tab; and the battery cell comprises a positive electrode and a positive tab, and a welding tension between the positive electrode and the positive tab is greater than 25 N.

2. The battery according to claim 1, wherein the depth of the concave part is between 20 μm and 70 μm.

3. The battery according to claim 1, wherein a sidewall of the concave part at least has a partial cylindrical wall surface or a partial truncated cone-shaped wall surface.

4. The battery according to claim 1, wherein a diameter of the dot-shaped welding mark is between 50 μm and 300 μm; and/or, a distance between two adjacent dot-shaped welding marks is not less than 100 μm.

5. The battery according to claim 1, wherein the empty foil zone is located in the middle of the electrode.

6. An electronic product, comprising the battery according to claim 1.

7. A manufacturing method of a battery, comprising:

providing electrodes, tabs and a separator, wherein each of the electrodes has a coating zone and an empty foil zone;

for each pair of an electrode and a tab, attaching the empty foil zone of the electrode to the tab; performing by using a laser welding device, pulse dot welding from a surface of the empty foil zone facing away from the tab to form a plurality of dot-shaped welding marks arranged at intervals; each of the dot-shaped welding marks comprising a concave part and an annular convex part surrounding a periphery of the concave part; wherein the plurality of dot-shaped welding marks are arranged in an array; a minimum distance between a dot-shaped welding mark and the coating zone is larger than 1 mm; a height of the annular convex part is within 30 μm; and a depth of the concave part is smaller than a sum of thicknesses of the empty foil zone and the tab;

processing the electrodes welded with the tabs and a separator together to form a battery cell; and assembling the battery cell into a housing to form the battery;

wherein the battery cell comprises a positive electrode and a positive tab, and a welding tension between the positive electrode and the positive tab is greater than 25 N.

* * * * *